(12) United States Patent
Baylis

(10) Patent No.: US 7,216,745 B2
(45) Date of Patent: May 15, 2007

(54) MOUNTING FRICTION ELEMENTS TO DISC BRAKES

(75) Inventor: Christopher Stanford Baylis, Hexaham (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/450,572

(22) PCT Filed: Dec. 17, 2001

(86) PCT No.: PCT/GB01/05542

§ 371 (c)(1),
(2), (4) Date: Oct. 6, 2003

(87) PCT Pub. No.: WO02/48567

PCT Pub. Date: Jun. 20, 2002

(65) Prior Publication Data

US 2004/0074711 A1    Apr. 22, 2004

(30) Foreign Application Priority Data

Dec. 16, 2000 (GB) ................................. 0030792.6

(51) Int. Cl.
*F16D 55/40* (2006.01)
(52) U.S. Cl. .................. 188/73.32; 188/73.31
(58) Field of Classification Search ............ 188/73.32, 188/71.5, 73.33, 73.34, 73.31, 73.1, 73.2
See application file for complete search history.

(56) References Cited

U.S. PATENT DOCUMENTS

| | | | | |
|---|---|---|---|---|
| 3,991,860 A | * | 11/1976 | Clemmons ............... | 188/73.32 |
| 4,570,759 A | * | 2/1986 | Ferret Bofill et al. .... | 188/73.32 |
| 4,576,257 A | * | 3/1986 | Carre et al. .............. | 188/73.32 |
| 4,606,439 A | * | 8/1986 | Meynier et al. ......... | 188/73.32 |
| 4,773,511 A | | 9/1988 | Giering et al. ........... | 188/73.38 |
| 4,784,242 A | | 11/1988 | Thioux .................... | 188/73.34 |
| 5,257,679 A | * | 11/1993 | Weiler et al. ............ | 188/73.32 |
| 5,538,105 A | * | 7/1996 | Rike ....................... | 188/73.32 |
| 6,062,349 A | | 5/2000 | Boisseau et al. ......... | 188/73.45 |
| 6,360,670 B1 | | 7/2001 | Machara .................. | 188/73.47 |
| 6,357,559 B1 | * | 3/2002 | Madzgalla et al. ...... | 188/73.32 |
| 6,705,437 B2 | * | 3/2004 | Severinsson et al. .... | 188/73.32 |

FOREIGN PATENT DOCUMENTS

| | | | |
|---|---|---|---|
| DE | 2931216 | | 3/1981 |
| DE | 4317286 | | 12/1994 |
| DE | 19822606 | | 5/1999 |
| GB | 2004958 | | 4/1979 |
| GB | 2074262 A | * | 10/1981 |
| GB | 2114691 | | 8/1983 |
| JP | 1422686 | | 1/1976 |
| JP | 09136250 | | 5/1997 |
| JP | 2000291700 | | 10/2000 |
| WO | WO 9857073 | | 12/1998 |

\* cited by examiner

*Primary Examiner*—Thomas Williams
(74) *Attorney, Agent, or Firm*—Scott A. McBain

(57) ABSTRACT

Disk brake friction element mounting system provides spaced mounting elements or guides for the friction elements, the spacing of the mounting elements permitting at least one friction element to be located in its working position by insertion edgewise through the space between the mounting elements without removing the brake discs or disc. The friction element is supported and guided by laterally extending shoulder having downwardly facing receptors for the mounting elements. In this way friction element insertion and removal for servicing purposes is greatly simplified.

11 Claims, 1 Drawing Sheet

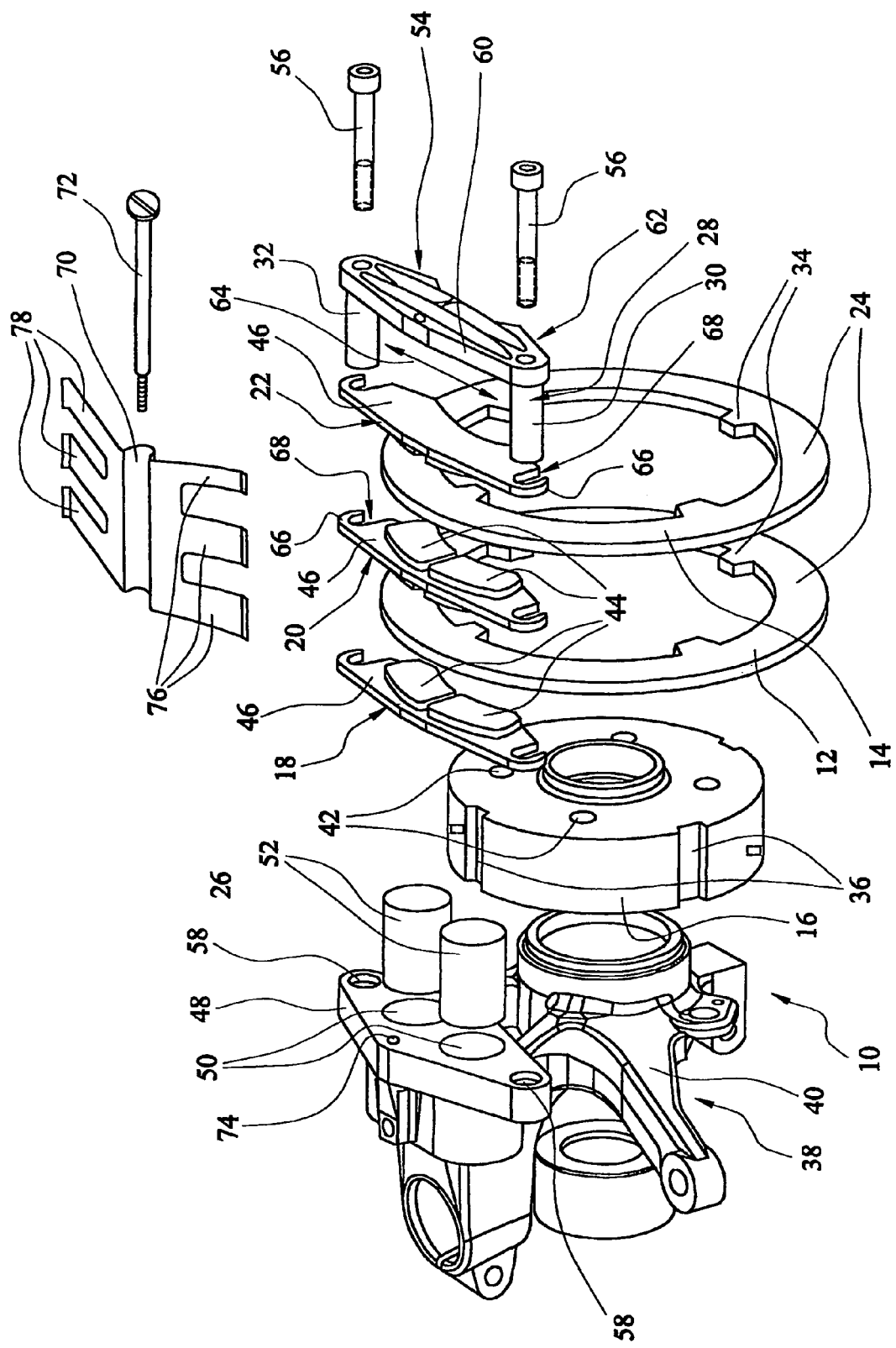

MOUNTING FRICTION ELEMENTS TO DISC BRAKES

BACKGROUND OF THE INVENTION

1. Technical Field

This invention relates to a method and apparatus applicable to the mounting of friction elements in disc brakes. An example of the application of the invention is to spot-type automotive disc brakes of the kind employing at least one axially slidable brake disc. However, certain aspects of the invention are more widely applicable, although the specific embodiments described below relate to disc brakes of this kind.

2. Related Art

The mounting of friction elements in relation to disc brakes is of practical significance in relation to not only the original assembly but also the routine replacement of the friction elements after a period of service and wear of the friction pad surfaces. In the past it has been usual for friction elements to be mounted and guided for axial sliding movement (where appropriate) by means of various guide structures which are straight forward to assemble when initially assembling the brake, but which do not lend themselves readily to subsequent removal of individual parts such as the friction elements. Accordingly, removal of the friction elements usually entails a substantial disassembly operation.

There is disclosed in WO98/25804 a disc brake assembly of the sliding-disc and fixed-caliper kind in which (see FIG. 1) the friction elements are arranged to be hooked over slide structures at the lateral edges of the fixed caliper. Accordingly, such an arrangement requires insertion and removal of the friction elements in a generally axial direction, with consequential axial removal of at least one brake disc in most cases. Therefor, it remains a fact that some significant improvement in accessibility of friction elements for servicing purposes would be of considerable importance for cost effective disc brake utilisation.

SUMMARY OF THE INVENTION

We have discovered that a significant simplification of the mounting of disc brake friction elements can be achieved by means of a modification of the friction element support system whereby the friction elements are supported on guide elements which are, in use, positioned at a spacing such that at least the main body of the friction element can be inserted edgewise through the space between the guide elements without removing the brake disc or discs. This arrangement permits significant advantages in terms of providing a facility for edgewise (regardless of proportions) insertion of the friction elements through the space between the guide elements for assembly and disassembly purposes. The significance of edgewise insertion between the guide elements (as opposed to the more usual arrangements) is that it offers the possibility to mount and dismount the friction elements without any prior assembly or disassembly operations. In other words, the supports for the friction elements (after they have been mounted) are disposed at a location such that they permit mounting and dismounting of the friction elements in a free manner without requiring any preliminary operations to make space available for such insertion. To put it another way the structure provided for supporting the friction elements is positioned so that these can be inserted into a space therefor, access to which is not blocked by the friction element support elements and moreover the location of these is such that they can be caused to commence their support and guidance function after insertion of the friction elements with a minimum of assembly operations. Thus, for example, in the embodiments the arrangement provided for supporting the friction elements on the guide elements therefor between which they are inserted is that of providing shoulder or hanger elements projecting from the friction elements laterally and permitting mere location over the guide elements in order to commence the support and guide function. In simple terms, the friction elements are inserted between the guide elements and hang therefrom, permitting removal by mere lifting, and insertion by mere reversal of this operation.

In the embodiments, the structure of the brake is such that a minimum of components of the brake, if any, require removal before the friction elements can themselves be removed. Typically, resilient means acting on the friction elements for anti-tilt and dynamic control purposes merely requires preliminary removal.

It can now be seen that the concept linking the embodiments of the present invention relates to the provision of a disc brake in which the friction elements are supported on spaced guide or mounting elements through the space between which the friction elements are inserted in an edgewise manner and from which they derive lateral support. This offers a relatively straightforward manner for achieving significant simplification and improvement of the technique for mounting and dismounting friction elements in disc brakes, thus providing a basis for meeting the object of the present invention, namely to provide improvements in relation to one or more of the matters discussed above.

According to the invention there is provided a method and apparatus relating to the mounting of friction elements in disc brakes.

In the embodiments of the invention disclosed below the features relating to the mounting of the friction elements are disclosed in relation to disc brakes of the kind comprising at least one axially-slidable disc together with an associated fixed caliper of generally open framework format in which spaced mounting and guide elements form the circumferentially-spaced and axially-extending side portions of that framework onto which the friction elements are readily mounted by simple insertion into the frame work with easy lodging and engagement of laterally-extending openended mounting channels or shoulders so as to provide the necessary support and guidance functions.

It may be possible to utilise the general principles of the present invention in relation to fixed disc and sliding or tiltable caliper disc brakes, but some adaptation will be needed in view of the generally massive construction of the calipers for such brakes. This massive construction arises from the significantly different function of movable calipers in such fixed disc brakes, and therefore the provision of a substantial opening in the caliper for edgewise insertion of the friction elements may have consequential caliper design implications. In principle however the concept is applicable to such brakes, though the practical implications are more easily reconciled in the case of sliding caliper brakes rather than those of the tilting caliper kind.

A search has identified the references discussed below.

GB 2104691A relates to brake linings and discloses a a disc brake in which slidable friction elements are retained by a retaining spring arrangement with respect to mounting pins 19 but the removal of the friction elements for servicing can not be accomplished with the brake main structure in its working position.

GB 2004958A (Societe) discloses a disc brake and noise-reducing spring for such a brake, and although the friction elements appear nominally to be radially removable from the caliper, in fact the friction element mounting pins 24, 26 require to be removed themselves before the friction elements can be removed and in any case these pins do not themselves serve to mount and guide the friction elements.

GB 1422686A (Sumitomo) discloses a disc brake assembly comprising a massive cast caliper in which the friction pads slide on pins passing through holes in the pads, as seen in FIG. 2, and thus the pad mounting and supporting arrangement is relatively complex and pad removal is not a simple operation.

U.S. Pat. No. 4,784,242 (Bendix) discloses a pad for a disc brake having mounting lugs 12, 12—as seen in FIG. 1 which permit axial sliding movement but removal of the pads requires substantial movement and rearrangement of the caliper 1, as can clearly be seen from FIGS. 3 and 4.

U.S. Pat. No. 4,773,511 (Lucas) discloses a hold down leaf spring for the brake lining back plate of a disc brake. The pads are guided by the four guide elements 67, 69 seen in FIG. 4 and thus the brake mounting structure differs substantially from that of the present invention which is based upon the use of mounting and guiding and supporting elements between which the friction elements are inserted and removed for mounting and dismounting purposes.

DE 002931216 (Teves) discloses a disc brake with a floating disc. The friction pads slide on guide bolts but can only be removed after executing axial movement to reach special reduced diameter positions on the bolts for this purpose, whereby substantial retraction of the actuating pistons and associated structure is required.

There is no disclosure in these references of a disc brake system in which an axially slidable rotatable brake disc has mounting and guiding and supporting means for its friction elements comprising fixed and circumferentially spaced elongated mounting and guiding and supporting elements of which the circumferential spacing permits the friction elements to be located in their working positions by insertion edgewise in the direction generally towards the axis of rotation of the brake disc and between the mounting elements in the working positions of same and without removing the brake disc.

In the embodiments described below of the present invention resilient means acts between structure fixed to the mounting means and the friction elements and inserts a generally inwardly directed force on the latter which serves to retain the friction elements in place on the mounting elements. The friction elements are removable from the brake upon removing or disengaging the resilient means from the friction elements but without the need for removal of or movement of any other structure element of the brake.

THE DRAWING

Embodiments of the invention will now be described by way of example with reference to the accompanying drawing in which there is shown an exploded view of a twin-disc sliding-disc disc brake comprising a fixed caliper structure providing mounting structure for three friction elements in accordance with the present invention.

DETAILED DESCRIPTION

As shown in the drawing, a disc brake 10 comprises twin rotatable brake discs 12, 14 and a rotatable mounting hub 16 therefor, together with three friction elements 18, 20, 22 located in working positions at opposite sides of the discs to frictionally engage the axially facing braking surfaces 24 on opposite sides of each of the two discs, under the action of actuating means 26 for the friction elements.

Mounting structure 28 for the friction elements comprises spaced mounting elements 30, 32, to be more fully described below.

Having thus outlined the principal structures of the disc brake 10, we will now consider these in more detail.

Brake discs 12, 14 are axially-slidably mounted on hub 16 by means of inwardly-extending drive dogs 34 cooperating with keyways 36 formed in the hub. For a more complete disclosure of the details of a disc brake of this kind, reference is directed to the disclosure in WO 98/26192 and/or WO 98/25804 which are incorporated herein by reference. Hub 16 forms part of a road wheel mounting assembly 38 for a small mass-produced automobile. The disc brake 10 illustrated here is for one of the front wheels thereof. The road wheel mounting assembly 38 provides a steering knuckle for connection to the vehicle's wheel articulation and steering systems in the usual way.

Hub 16 provides at locations 42 for road wheel mounting studs (not shown).

Friction elements 18, 20 and 22 comprise two one-sided end friction elements 18, 22 and a central double friction element 20 which is sandwiched between the brake discs 12, 14. Each of the friction elements comprises pads 44 of friction material for frictional engagement with the brake discs. In this case, each of the braking surfaces 24 is engaged by a pair of pads 44 of friction material in this spot-type disc brake in which frictional engagement with the discs by the pads is effected over only a relatively small sector of the rotational path of the discs at any given time. Each friction element comprises its complement of pads of friction material 44 mounted on a metallic backing plate 46 which is of a stiff metallic construction and adapted to hold and maintain its pads of friction material in planar relationship to the braking surfaces 24 of the discs.

As mentioned above, central friction element 20 is double-sided and thus comprises pairs of pads 44 of friction material on its opposite sides, whereas the other two friction elements are provided with friction material pads on one side only. Details of the inter-relationship of the friction elements and the mounting elements 30, 32 will be described below.

Turning now to the actuating system 26 for the friction elements, this comprises a cast cylinder block 48 formed with twin cylinders 50 and twin pistons 52 received therein and hydraulically connected to a drivers control system including a master cylinder assembly (not shown). Pistons 52 are arranged to actuate the inboard friction element 18 by direct engagement with the backing plate 46 thereof at locations generally in-line with tits pads 44 of friction material. Cylinder block 48 forms part of the road wheel mounting assembly 38 including steering knuckle 40. These structures form a substantial and rigid assembly largely formed of metallic castings and well suited to provide a structurally strong mounting for the fixed caliper assembly 54 of the disc brake 10 which is secured thereto by high tensile bolts 56 which extend through the tubular-format mounting elements 30, 32 for threaded engagement with openings 58 in cylinder block 48. Caliper assembly 54 has a cast end plate 60 joining the mounting elements 30 (and internal bolts 56), thereby forming a somewhat rectangular framework 62 comprising cylinder block 48, the mounting elements 30, 32 and end plates 60. This open frame work is of significance in relation to the mounting of the friction elements 18, 20 and 22, as will now be described.

As can clearly be seen in the drawing, the spacing of the mounting elements 30, 32 is such as to permit at least one, and in this embodiment all three of the friction elements to be located therebetween by insertion into their working positions in the space 64 between the mounting elements. When so inserted, as shown in the drawing, the friction elements are supported on the mounting elements 30, 32 for brake operational purposes. Likewise, the friction elements can be removed from their working positions in due course after friction pad wear, or otherwise, by reversal of the insertion steps.

Details of the structures whereby the friction elements are supported on the mounting elements will now be considered. As clearly shown in the drawings, each friction element backing plate 46 is of generally elongated format having profiled upper and lower edges between which the pads 44 of friction material are secured by bonding to the relevant axially-facing side face of the backing plate. At the opposite ends of the elongate plate structure there are provided shoulders 66 formed with downwardly-opening channel-shaped receptors 68 adapted to receive the mounting elements 30, 32. In this way, each of the friction elements can be effectively supported on and indeed hangs from the mounting elements 30, 32. In this way, each of the friction elements is freely slidably mounted but can be readily removed by mere application of the appropriate lifting force.

However, after the friction elements have been inserted in place on the mounting elements 30, 32 there is applied to the assembly a multiple-limbed leaf spring assembly 70 which is secured in place by a mounting bolt 72 of which the threaded end engages a threaded bore 74 in cylinder block 48. The three laterally-extending leaf spring arms 76, 78 at each side of the leaf spring assembly 70 act on the respective ends of the friction elements 18, 20, 22 so as to provide an anti-tilt function and a degree of dynamic control. The widths of the leaf spring arms 76, 78 are such as to accommodate the small degree of linear movement of the friction elements during use without the need for the spring itself to move.

In use, the disc brake 10 is operational as follows.

Braking operations themselves proceed normally as disclosed in the prior WO documentation and as will be apparent from the foregoing description.

Insertion and removal of friction elements 18, 20 and 22 on an initial assembly and for servicing and related purposes is effected as follows.

Framework 62 is an open structure apart from the presence of leaf spring assembly 70 mounted above it. Therefore, prior to mounting leaf spring 70 in place, the friction elements can be simply manually inserted into the generally rectangular central opening defined by framework 62 and the friction elements 18, 20 and 22 can be lodged therein in interleaved relationship with the brake discs 12, 14 and with receptors 68 of shoulders 66 of backing plates 46 duly received on the tubular mounting elements 30, 32. After such assembly, the leaf spring 70 can be secured to cylinder block 48 and assembly is complete.

Disassembly proceeds by the reversal of the above operations, and is effected equally speedily and simply.

Although the embodiments of the invention have been described above in relation to a disc brake based upon a caliper provided at the outer periphery of an annular brake disc or discs, it is to be understood that the invention is equally applicable to disc brakes in which the caliper assembly is mounted to extend across the inner periphery of a brake disc assembly which is driven from the radially outer portion thereof.

The invention claimed is:

1. A method of mounting slidable friction elements in a spot-type automotive disc brake, the method comprising:
   providing a disc brake comprising a rotatable mounting and a plurality of axially slidable, rotatable brake discs being slidably mounted on said rotatable mounting together with at least one pair of friction elements located in working positions at opposite sides of each of said discs for frictional engagement with braking surfaces on said discs under action of an actuating system for said friction elements;
   providing a mounting and guiding and supporting structure for said friction elements comprising an axially fixed caliper straddling a periphery of said discs and operatively axially fixed and circumferentially spaced axially-extending guides mounted to said fixed caliper for supporting said friction elements;
   providing the circumferential spacing of said spaced guides permitting at least some of said friction elements to be located in their working positions by insertion edgewise and in a direction generally towards an axis of rotation of said brake discs onto said guides without removing said brake discs and said guides, and said some of said friction elements being adapted to be mounted and supported and guided for axial sliding movement on said guides relative to said fixed caliper when in use of said brake; and
   said method comprising mounting at least said one of said friction elements onto said guides by such insertion.

2. A spot-type automotive disc brake, the brake comprising:
   a rotatable mounting;
   a plurality of axially slidable rotatable brake discs being axially slidably mounted on said rotatable mounting;
   at least one pair of slidable friction elements located in working positions at opposite sides of each of said discs for frictional engagement with braking surfaces on said discs under action of an actuating system for said friction elements;
   a mounting and guiding and supporting structure for said friction elements comprising an axially fixed caliper straddling a periphery of said discs and operatively axially fixed and circumferentially spaced axially-extending guides mounted to said fixed caliper for supporting said friction elements;
   the circumferential spacing of said spaced guides permitting at least one of said friction elements to be located in its working position by insertion edgewise and in a direction generally toward an axis of rotation of said brake discs onto said guides without removing any of said brake discs and said guides, and said one of said friction elements being adapted to be mounted and supported and guided for axial sliding movement on said guides relative to said fixed caliper when in use of said brake; and
   at least said one of said friction elements being adapted to be mounted on said guides by such insertion.

3. A disc brake according to claim 2 wherein at least said one friction element comprising laterally-extending shoulders to cooperate with said spaced guides and said shoulders being formed with open-ended receptors to receive said spaced guides to support said friction element thereon.

4. A disc brake according to claim 3 wherein said receptors are substantially U-shaped.

5. A disc brake according to claim 2 including a resilient device disposed in the spacing between said guides and being operative to exert a generally inwardly-directed force on said friction elements and serving to retain said friction elements in place on said guides.

6. A disc brake according to claim 5 wherein said friction elements being removable from said brake upon releasing friction elements but without the need for movement of said guides of said brake.

7. A disc brake according to claim 5 including a bolt arranged between and extending parallel to said spaced guides.

8. A disc brake according to claim 7 wherein said resilient device is disposed between said bolt and said friction elements and acts to exert a bias force on said resilient device which in turn acts to exert a bias force on said friction elements.

9. A disc brake according to claim 8 wherein said resilient device includes a plurality of arms extending from each side of said resilient device with said arms engaging said friction elements to constantly urge said friction elements radially inwardly against said guides.

10. A spot-type braking system, comprising:
a wheel hub rotatable about an axis;
at least one brake disc mounted on said wheel hub for rotation with said wheel hub about said rotation axis and being axially slidable relative to said wheel hub;
a brake caliper having a pair of axially spaced guides and a space between said guides that is open to a top of said caliper in a direction radially away from said at least one brake disc;
at least one friction element supported on said guides of said caliper and slideable along said guides, said at least one friction element being insertable edgewise and in a direction generally toward said rotation axis through said opening into operative position in relation to said at least one brake disc and supported on said guides;

a mounting bolt removably coupled to said caliper and said wheel hub for axially fixing said caliper relative to said wheel hub and said mounting bolt extending across said opening in parallel laterally spaced relation to said guides; and a leaf spring disposed in said opening and acting between said mounting bolt and said at least one friction element to constantly urge said friction element radially inwardly against said guides.

11. A disc brake according to claim 10 wherein said leaf spring includes a plurality of arms extending from each side of said leaf spring with said arms engaging said friction elements.

* * * * *